(12) United States Patent
Schumacher

(10) Patent No.: US 9,975,509 B2
(45) Date of Patent: May 22, 2018

(54) CONTROL DEVICE AND METHOD FOR TRIGGERING PASSENGER PROTECTION MEANS FOR A VEHICLE

(75) Inventor: Hartmut Schumacher, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1065 days.

(21) Appl. No.: 12/673,894

(22) PCT Filed: Jul. 7, 2008

(86) PCT No.: PCT/EP2008/058764
§ 371 (c)(1),
(2), (4) Date: Jul. 15, 2011

(87) PCT Pub. No.: WO2009/024394
PCT Pub. Date: Feb. 26, 2009

(65) Prior Publication Data
US 2011/0260554 A1    Oct. 27, 2011

(30) Foreign Application Priority Data

Aug. 23, 2007   (DE) .................. 10 2007 039 835

(51) Int. Cl.
*B60L 1/00*    (2006.01)
*B60R 21/01*   (2006.01)

(52) U.S. Cl.
CPC ........... *B60R 21/01* (2013.01); *B60L 2260/40* (2013.01); *B60R 2021/0104* (2013.01); *Y10T 307/766* (2015.04)

(58) Field of Classification Search
CPC .................................................. B60L 2260/40

USPC .................................................. 397/9.1, 112
See application file for complete search history.

(56) References Cited

U.S. PATENT DOCUMENTS

| | | | | |
|---|---|---|---|---|
| 3,719,938 A | * | 3/1973 | Perlman | 340/556 |
| 5,206,578 A | * | 4/1993 | Nor | G01R 31/3658 |
| | | | | 320/118 |
| 5,525,843 A | * | 6/1996 | Howing | 307/9.1 |
| 5,784,626 A | * | 7/1998 | Odaohara | H02J 1/10 |
| | | | | 307/66 |

(Continued)

FOREIGN PATENT DOCUMENTS

| | | |
|---|---|---|
| DE | 3920713 A1 | 1/1991 |
| DE | 196 43 013 | 2/1998 |

(Continued)

*Primary Examiner* — Adi Amrany
(74) *Attorney, Agent, or Firm* — Norton Rose Fulbright US LLP; Gerard Messina

(57) ABSTRACT

A control device and a method for triggering a passenger protection arrangement for a vehicle are provided, an interface being provided that is used to receive at least one signal whose amplitude is a function of the vehicle battery voltage or a substitute voltage that takes its place. Furthermore, a trigger circuit is provided that triggers the passenger protection arrangement as a function of at least one signal. The interface has a circuit that derives at least one switching threshold from a supply voltage produced in the control device (substitute voltage that is retained for a certain amount of time in the autarchy case/under-supply case/contact problems) to detect the at least one signal, and one switching threshold that is directly derived from the battery voltage (standard), or from the amplitude of the bus voltage.

26 Claims, 3 Drawing Sheets

(56) References Cited

U.S. PATENT DOCUMENTS

| | | | |
|---|---|---|---|
| 6,070,114 A | 5/2000 | Fendt et al. | |
| 6,121,693 A * | 9/2000 | Rock | H02J 1/10 307/18 |
| 6,177,783 B1 * | 1/2001 | Donohue | G05F 1/565 323/272 |
| 6,242,891 B1 * | 6/2001 | Parsonage | G01R 19/16542 320/132 |
| 6,333,570 B1 * | 12/2001 | Ilg | H02J 1/10 307/75 |
| 6,566,765 B1 * | 5/2003 | Nitschke et al. | 307/10.1 |
| 6,722,462 B2 * | 4/2004 | Ikegami | 180/282 |
| 7,061,202 B2 * | 6/2006 | Sunaga et al. | 318/615 |
| 7,097,226 B2 * | 8/2006 | Bingle et al. | 296/76 |
| 7,205,681 B2 * | 4/2007 | Nguyen | H02J 1/10 307/18 |
| 7,242,565 B2 * | 7/2007 | Yoshio | H02H 3/085 361/103 |
| 7,379,282 B1 * | 5/2008 | Zansky | H02J 1/108 361/18 |
| 7,466,573 B2 * | 12/2008 | Kojori | H02J 1/10 323/271 |
| 7,511,389 B2 * | 3/2009 | Ozawa | B60R 16/03 307/10.1 |
| 2002/0057018 A1 * | 5/2002 | Branscomb | G06F 1/14 307/42 |
| 2003/0132669 A1 * | 7/2003 | Bahl | H02J 1/108 307/52 |
| 2004/0061474 A1 * | 4/2004 | Ozeki | G06F 1/263 320/101 |
| 2004/0095021 A1 * | 5/2004 | Fogleman | H02J 1/102 307/52 |
| 2004/0232864 A1 * | 11/2004 | Sunaga et al. | 318/434 |
| 2007/0030016 A1 * | 2/2007 | Schumacher et al. | 324/678 |
| 2008/0164881 A1 * | 7/2008 | Miyamoto | G01R 15/04 324/429 |
| 2010/0094575 A1 * | 4/2010 | Andrieu et al. | 702/63 |
| 2010/0106991 A1 * | 4/2010 | Noller | 713/323 |

FOREIGN PATENT DOCUMENTS

| | | |
|---|---|---|
| DE | 197 33 866 | 2/1999 |
| DE | 103 54 602 | 6/2005 |
| EP | 0 834 813 | 4/1998 |
| EP | 0 886 401 | 12/1998 |
| JP | 11-69663 | 3/1999 |
| JP | 2000-253594 | 9/2000 |
| JP | 2005-335470 | 12/2005 |
| JP | 2007-43825 | 2/2007 |
| RU | 2271945 C2 | 3/2006 |

* cited by examiner

CONTROL DEVICE AND METHOD FOR TRIGGERING PASSENGER PROTECTION MEANS FOR A VEHICLE

FIELD OF THE INVENTION

The present invention relates to a control device and a method for triggering a passenger protection arrangement for a vehicle.

BACKGROUND INFORMATION

German patent document DE 103 54 602 A1 discusses implementing a data communication between a control device for triggering a passenger protection arrangement and connection elements in a vehicle seat for weight measurement via a LIN bus. The LIN bus may be implemented as a single-wire bus. The signals of the connection elements are used to perform a passenger recognition, as a function of which the passenger protection arrangement is controlled by the control device for triggering the passenger protection arrangement.

SUMMARY OF THE INVENTION

In contrast, the control device according to the present invention and the method according to the present invention for triggering the passenger protection arrangement for a vehicle having the features of the independent claims have the advantage that a measure is provided that continues to ensure communication via the interface even in the event of a so-called autarchy case, for example. The autarchy case typically comes about in an accident in which a vehicle battery is separated. The present invention helps to the same extent in the event of contact problems relating to the vehicle battery voltage.

A stable detection of the incoming signal may be achieved in a simple manner by deriving the switching threshold from a supply voltage produced in the control device or from the amplitude of the received signal (e.g., a bus voltage) itself. In the non-autarchy case, the switching threshold may be directly derived from the vehicle battery voltage.

The present invention satisfies to the full extent the LIN specification, for example. The present invention achieves an emergency running property in the design within the scope of the LIN specification without feedback, and the interface and the method according to the present invention are implemented such that a robust signal detection is possible even under difficult voltage conditions.

The derivation of the parallel switching threshold may therefore be performed directly from the bus voltage. To this end, the bus open-circuit voltage is determined via a customary peak voltage circuit using suitable time constants, and the data switching threshold is produced using subsequent dividers.

The present invention does away with additional effort in the interface, in order to allow for it to function even outside of the LIN standardization. For example, the LIN standardization provides a battery voltage of 8 to 18 V.

The vehicle battery voltage that is normally used to define the switching threshold, and which is missing in the autarchy case or in the event of contact problems, is simulated by a fixed internal switching threshold. Thus, communication in a LIN bus system remains possible.

In the case at hand, a control device is an electric device that processes sensor signals, for example, using an evaluation algorithm, and as a function of this produces a trigger signal for the passenger protection arrangement for a vehicle. In this context, to trigger means that the passenger protection arrangement(s) is activated. This may also occur in stages, for example. Airbags, belt tighteners, but also an active passenger protection arrangement such as a vehicle dynamics control or brakes are considered passenger protection arrangements.

In the case at hand, an interface is to be understood as hardware or software. The interface may also be formed by a combination of the above. Integrated circuits, discrete circuits, or combinations of the two are considered as hardware implementations. The interface may also be formed by a software module on a processor, such as a microcontroller, for example.

As specified above, the received signal is a LIN bus signal, for example. However, other bus signals are also a possibility. Signals from a point-to-point connection, for example, through a current interface, may also be used as the signal in the sense according to the present invention. The signal may also be a multiplex of a plurality of signals. This signal is normally derived from the amplitude of the vehicle battery voltage and therefore is subjected to fluctuations in the event of a separation. However, the switching threshold for detecting the signal may also be derived from the signal amplitude.

The trigger circuit may be implemented as hardware and/or software. The trigger circuit not only evaluates the signal that is received, but also generates the trigger signal for the passenger protection arrangement. In this context, the trigger circuit may comprise a microcontroller and the circuit that activates the power switches for connecting the ignition current to the passenger protection arrangement.

The circuit according to the present invention may also be implemented as hardware and/or software. In particular, it may exist as part of an integrated circuit. When the signal is received, the detection of the signal is an essential action for the evaluation of this signal. In this context, in the case of a digital signal, for example, a clear difference between a 0 and a 1 must be made. The switching threshold is used for this purpose. This switching threshold must be derived in a reliable manner. A supply voltage produced in the control device or the signal amplitude itself is used for this purpose, according to the present invention. The supply voltages produced in the control device are formed in a robust manner from the vehicle battery voltage, and in the autarchy case, that is, in the event of a separation of the vehicle battery, formed from an energy reserve.

Advantageous improvements of the control device and method, respectively, for triggering the passenger protection arrangement for a vehicle recited in the independent claims are rendered possible by the measures and further refinements recited in the dependent claims.

In this context, it is advantageous that a supply module is provided that produces the supply voltage as digital levels. A plurality of digital levels, for example, 5 V and 3.3 V, are necessary in a control device in order to supply energy to the existing subassemblies of the control device. This is achieved by the supply module. For example, in this context, the supply module may have a step-up converter, a step-down converter, and a linear controller. These converters are normally implemented as switching converters. Since this energy supply is implemented in a very robust manner in a control device for triggering the passenger protection arrangement, it is extremely advantageous to use the switching threshold from this supply voltage to detect the signal.

The digital levels produced by the supply module for the control device are a reliable basis for deriving the switching threshold.

It is also advantageous that the interface forms an integrated switching circuit with the circuit and the supply module. Thus, integrated switching circuits that are cost-effective and that have a high reliability may be produced in a very advantageous manner for such control devices. In addition to the supply module and the interface featuring the circuit according to the present invention, further functions may also exist in this integrated module. This includes airbag functions such as a redundant check of the sensor signals in comparison with the microcontroller, for example. In this manner, a so-called safety controller is implemented, which achieves the necessary reliability for the control device through a redundant evaluation of the sensor signals and which releases the ignition circuit only when it also detects that a triggering case exists. Additional interfaces and functions may be contained in the integrated switching circuit according to the present invention.

It is also advantageous that the detection using the switching threshold is performed by a first comparator, for example, a reference input element, at one input of which the switching threshold from the supply voltage is applied via a resistor and a diode, and the vehicle battery voltage is also applied at this one input, also via a diode and a resistor, for example, so that ultimately the voltage having a higher value forms the switching threshold at the comparator. Through the use of diodes in the forward direction, the branch having a lower voltage than the other branch is blocked. Thus, in the autarchy case, the branch having the diode and the resistor and the supply voltage dominates. In this context, at least one resistor and at least one diode must be used. It is alternatively possible to use even more components. This input of the comparator is connected to ground via at least one resistor. An additional resistor may be used to generate a suitable hysteresis. This resistor is serially connected to the resistor that is connected to ground.

Alternatively, it is advantageous to use two comparators and, for example, to use reference input elements in this context, the first comparator forming the switching threshold using the vehicle battery voltage, and the second comparator forming the switching threshold using the supply voltage selected according to the present invention. If the vehicle battery voltage is interrupted, then the reference input element that derives the switching threshold from the vehicle battery voltage will always determine a detection of a logical 1 in the event of a battery separation, and thus will not cause a disturbance in a logical AND operation with the second output signal of the second reference input element in the autarchy case. This is because a logical 1 is determined as detection only when the second comparator also determines a logical 1. If the second comparator, whose switching threshold is derived from the supply voltage, determines a logical 0, then this logical 0 is also recognized as a detection. The derivation from the supply voltage does not mean that the supply voltage is used directly, but rather an intermediate value or a value derived from the supply voltage itself, for example. However, it is possible to use the supply voltage directly.

Advantageously, the switching threshold is established using a hysteresis circuit. As a switching threshold, the hysteresis has a great robustness relative to a fixed switching threshold. Circuits known to one skilled in the art may be used to implement the hysteresis.

It is also advantageous that the interface may be refined to the effect that it is also designed to send data in the autarchy case. A so-called pull-up circuit may be used for this purpose. This pull-up circuit, using the supply voltage or a voltage derived from it or a voltage from which the supply voltage is derived, may route this voltage via at least one resistor and a diode, to the transmission line, the LIN bus. This voltage may then be modulated with the information content.

Exemplary embodiments of the present invention are illustrated in the drawings and explained in greater detail in the following description.

DETAILED DESCRIPTION

Figure 1:
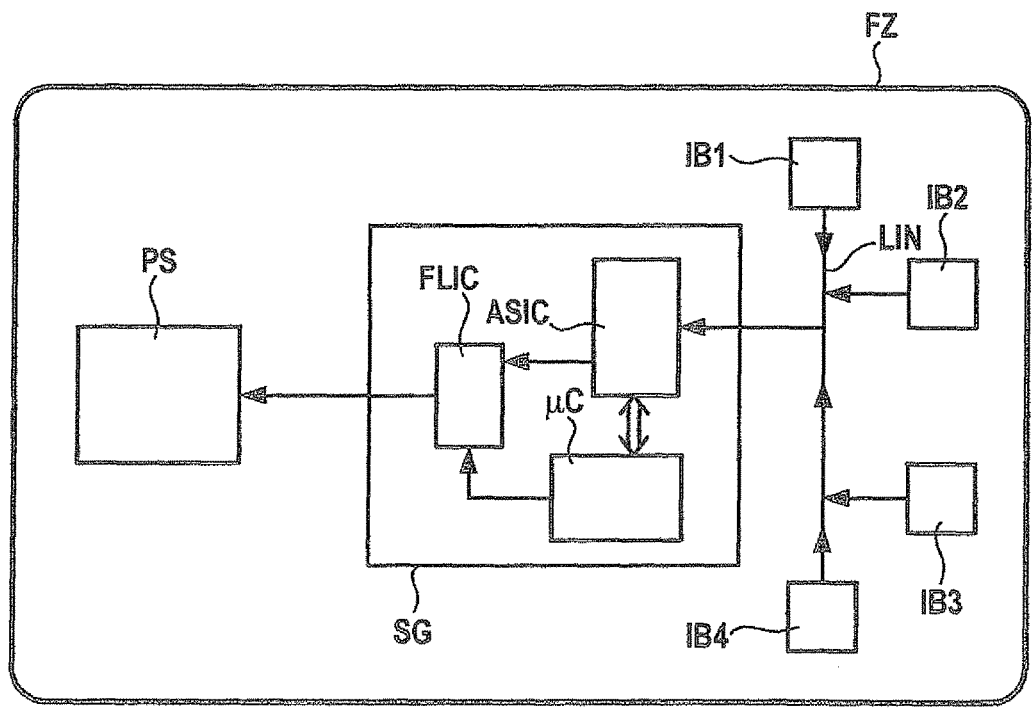
FIG. 1 shows a block diagram of the control device according to the present invention in the vehicle.

FIG. 1 shows control device SG according to the present invention in a vehicle FZ having connected components. In the case at hand, seat force sensors IB1 to 4 are connected to control device SG via a LIN bus LIN to an integrated circuit ASIC, which features the interface according to the present invention featuring the circuit according to the present invention. Integrated circuit ASIC is connected to microcontroller µC, that is, the trigger circuit, via a data input/output, in order to relay for further evaluation the data that the ASIC detects via LIN bus LIN, for example. Microcontroller µC determines as a function of these data whether the passenger protection arrangement are to be triggered. Then it transmits a trigger command to circuit FLIC, which contains the ignition switch, via the so-called SPI bus, for example. But the ASIC also features a parallel evaluation of signals that are crash-relevant, and releases circuit FLIC only if the ASIC also detects such a trigger case. In the trigger case, passenger protection arrangement PS is activated.

In the case at hand, only the elements that are necessary for the invention are illustrated. Control device SG has additional subassemblies to ensure its operation; however, these subassemblies are not necessary to understand the exemplary embodiments and/or exemplary methods of the present invention. Additional external components like accident sensors may also be connected to control device SG. For the sake of simplicity, these have not been illustrated either.

According to the exemplary embodiments and/or exemplary methods of the present invention, in the so-called autarchy case or in the event of a contact problem of the vehicle battery voltage, the ASIC is able to detect the data from the LIN bus using a reliable switching threshold. This switching threshold may be derived from a supply voltage provided in the ASIC, a digital level, for example. Alternatively, it is possible to derive this switching threshold from the signal amplitude of the signals via the LIN bus. Thus, in the autarchy case, a continued evaluation of the signals can take place via the LIN bus for a certain amount of time. In the control device, the autarchy is provided by the energy reserve not shown in FIG. 1, usually one or a plurality of capacitors.

Figure 2:
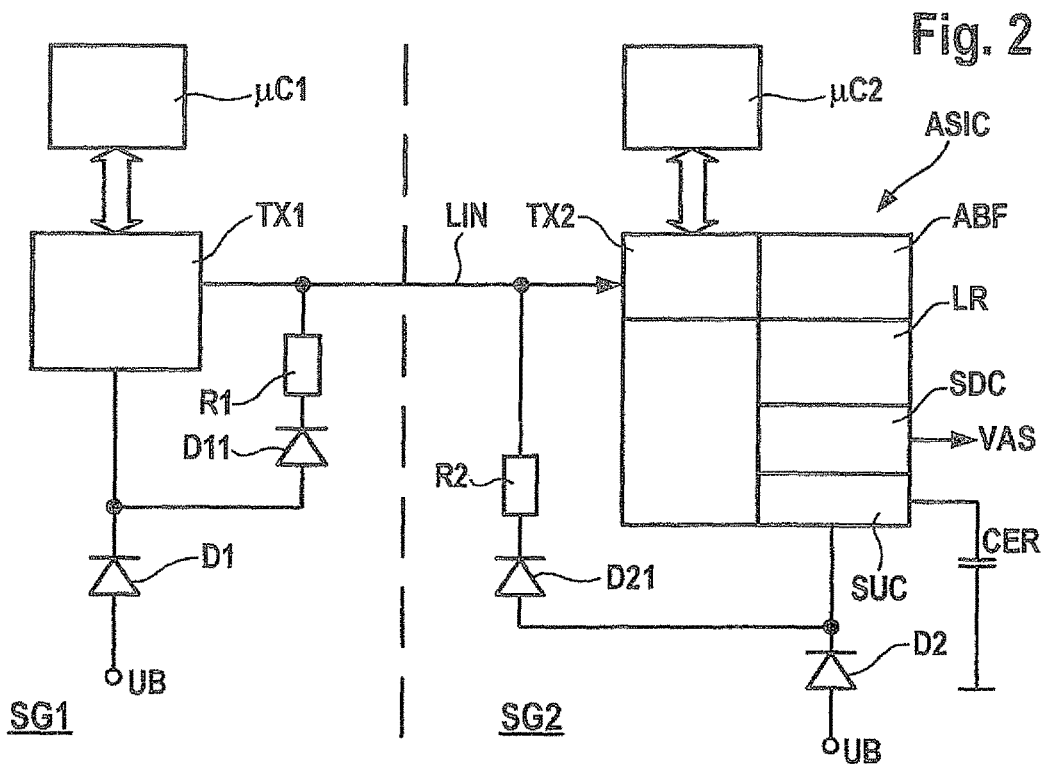
FIG. 2 shows a section of the control device according to the present invention receiving the signal from another control device in a manner according to the present invention.

FIG. 2 shows sections of control device SG2 according to the present invention, which communicates with an additional control device SG1 via LIN bus LIN. Additional control device SG1 has a microcontroller µc1 that processes sensor data, for example. These processed sensor data are transmitted from microcontroller µc1 to a transceiver TX1, which is able to transmit these processed sensor signals via LIN bus LIN. The voltages for the transmission and the operation of transceiver TX1 are provided by battery voltage UB. A diode D1 is used as reverse-polarity protection. Furthermore, the transmission voltage is provided via an additional diode D11 and a resistor R1 at LIN bus LIN. Both diodes D1 and D11 are polarized in the forward direction.

In control device SG2 according to the present invention, LIN bus LIN is connected to integrated switching circuit ASIC and thereby to interface TX2, which in this instance is also designed as a transceiver for the LIN bus. Transceiver TX2 is a part of integrated switching circuit ASIC. The ASIC has additional airbag functions ABF, like the above-mentioned safety controller, for example. Furthermore, the ASIC has the subassemblies for providing the supply voltages for control device SG2. In this instance, a step-up converter SUC, a step-down converter SDC, and a linear regulator LR are shown as examples. Step-down converter SDC provides voltage supply VAS, which is important according to the exemplary embodiments and/or exemplary methods of the present invention, and from which the switching threshold is derived. Battery voltage UB goes into step-up converter SUC after a reverse-polarity protection diode D2, and in the autarchy case the voltage from energy reserve CER. In the case at hand, this is shown in a simplified manner. Switching elements may exist between energy reserve CER and step-up converter SUC. Furthermore, after diode D2 polarized in the forward direction, a branch of the battery voltage to the transceiver is provided, which also has a diode D21 polarized in the forward direction and a resistor R2. This corresponds to diode D11 and resistor R1 in control device SG1. In the non-autarchy case, this voltage directly provides transceiver TX2 with the voltage from which it may derive its switching threshold from the vehicle battery voltage. The transmission voltage is also defined via R1 via this path. Each pull-up structure analogous to R1, D11 contributes to the stable provision of the BUS open-circuit voltage (high level), the master node most clearly since its pull-up resistance amounts to 1 kOhm relative to approximately 30 kOhm slave, for example. If SG2 forms the master node, transceiver TX2 essentially defines the BUS transmission voltage via R1, D11 in the non-autarchy case. In this instance, it derives from the reverse-polarity protected battery voltage after D2 a switching threshold suitable for receiving LIN data.

Again, only the elements that are necessary for the invention are illustrated. Additional elements of control device SG2 and control device SG1 are omitted for the sake of simplicity. For example, control device SG1 may be a control device that processes data of a plurality of weight sensors and transmits this information about the seat-occupancies to airbag control device SG2, so that the passenger protection arrangement is triggered as a function of these data, with regard to a passenger classification, for example.

Figure 3:
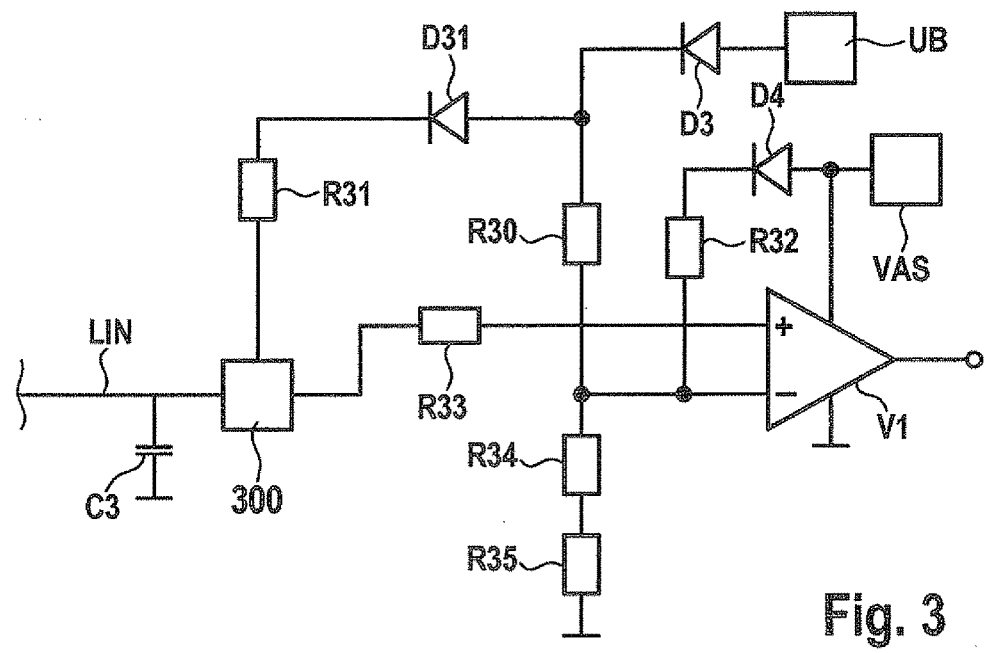
FIG. 3 shows an exemplary embodiment of the circuit according to the present invention.

FIG. 3 shows a development of the interface having the circuit according to the present invention, which forms the switching threshold according to the present invention. In the case at hand, reference input element V1 is used as a comparator. In this comparator V1, the signal transmitted from LIN bus LIN enters directly into the positive input of reference input element V1 via a connection 300 and a resistor R33. This LIN bus signal is compared to a switching threshold that is applied at the negative input of reference input element V1. In this context, the switching threshold is formed either from battery voltage UB, via reverse-polarity protection diode D3 and resistor R3 and voltage divider R34 and R35, or from voltage VAS, which is inside the control device and is derived both from battery voltage and from the energy reserve voltage VAS, via diode D4 and resistor R32, and then again via voltage divider R34 and R35. Due to diodes D3 and D4 polarized in the forward direction, in each instance the higher voltage UB or VAS will prevail in order to form the switching threshold. If the signal of LIN bus LIN is greater than the switching threshold formed by this process, reference input element V1 outputs a logical 1, otherwise, a logical 0. Thus, a switching threshold is obtained that may be formed in a reliable manner even in the autarchy case, in the event of too little battery voltage or in the event of contact problems (micro-interruptions). Instead of the so-called analog voltage VAS, digital voltages of the control device formed from analog voltage VAS by additional voltage regulators may be used, since these are also retained in the autarchy case.

Furthermore, diode D31 and resistor R31 are connected in series with connection point 300 to diode D3 polarized in the forward direction. In accordance with the norm, this pull-up structure forms the bus high-level in the rest state of the bus (no data traffic), for the slave, R31=1 kOhm, for the master, 30 kOhm. In the data transmission case, the transmitter-transistor/controllable current source becomes active in the rhythm of the data content via a diode to ground at point 300 (controlled by TxD) and draws the voltage at the BUS to a dominant low level. This may occur in each comparable transmitter structure of the devices located on the BUS.

Capacitor C3 is used to filter high-frequency disruptions on the bus in the direction of the receiver, or to set the corresponding curve steepness of the transmission pulses (falling/rising) together with the characteristic of the transmitter-transistor/controllable current source or pull-up R31, and thus to reduce the radiation.

In the case at hand, only the part that is necessary for the present invention is illustrated. For example, the hysteresis circuit that ensures that the switching threshold follows a hysteresis has been omitted, in order to make it more robust. One skilled in the art knows how such a hysteresis circuit is to be implemented via transistors and operational amplifiers.

The output of comparator V1 forms the basis for generating receiver signal RxD of the transceiver. In the simplest case, they are identical; in more robust systems, an additional interference suppression may be performed via a digital filter.

Figure 4:
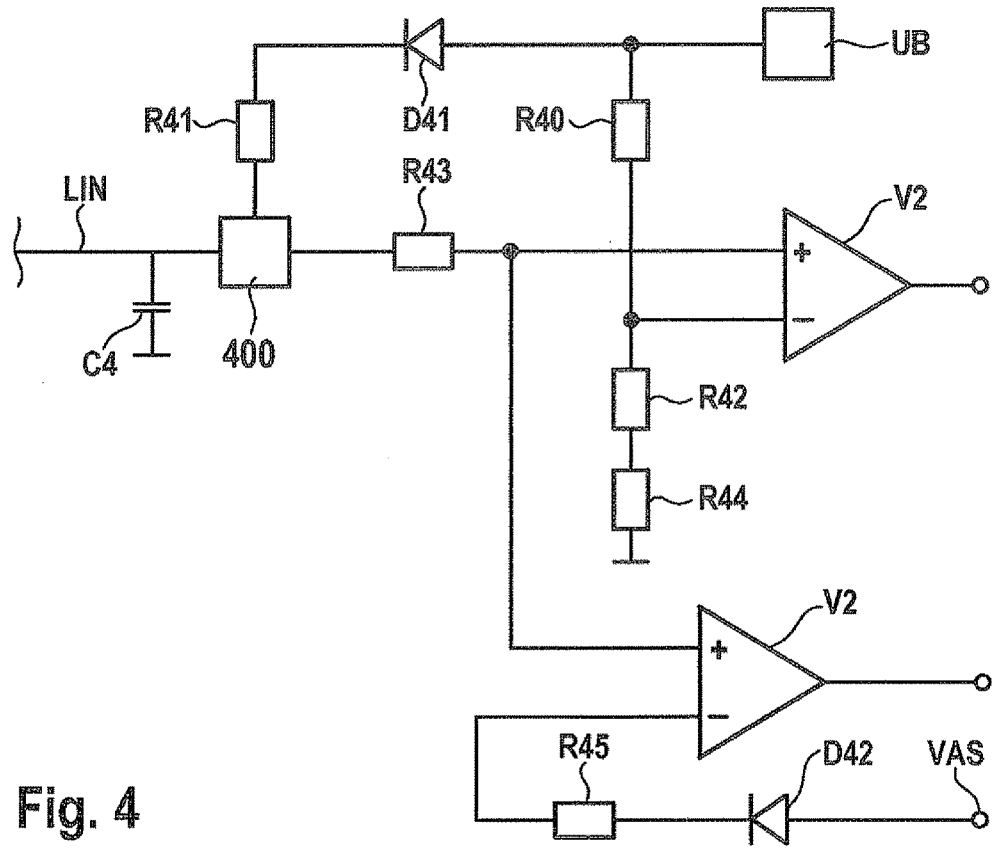
FIG. 4 shows an additional exemplary embodiment of the circuit according to the present invention.

FIG. 4 shows an alternative development. Components C4, 400, R41, and D41 correspond to components D31, R31 and connection point 300, and capacitor C3 in FIG. 3. Resistor R33 corresponds to resistor R43 in FIG. 4.

In the case at hand, the use of two comparators V2 and V3 designed once again as reference input elements is provided. In this context, battery voltage UB is connected to first comparator V2 at the negative input via voltage divider R40, R42, and R44, in order to compare it to the input signal via LIN bus LIN for the detection of the signal. However, this input signal is provided to an additional reference input element V3 and, in turn, to the positive input. Analog supply voltage VAS, which is also present in the autarchy case and which is used to form the switching threshold, is connected at the negative input of this second reference input element V3, in turn via a diode D42 and a resistor R45.

In the non-autarchy case, second reference input element V3 will always output a logical 1, since the threshold, formed from VAS, is smaller than the switching threshold that is derived from vehicle battery voltage UB. Using a so-called wired-or link of reference input elements V2 and V3, it is thus possible to achieve a situation in which the signal of reference input element V2 prevails as a controlling factor in the non-autarchy case. The case is reversed in the autarchy case. In this context, reference input element V2 will always output a logical 1, while reference input element V3 detects the signal correctly through the switching threshold from supply voltage VAS.

The outputs of comparators V1 and V3, linked by wired-or, form the basis for generating receiver signal RxD of the transceiver. In the simplest system, it is identical; in more robust systems an additional signal interference suppression may be performed via a digital filter after the linking, or previously, respectively.

Figure 5:
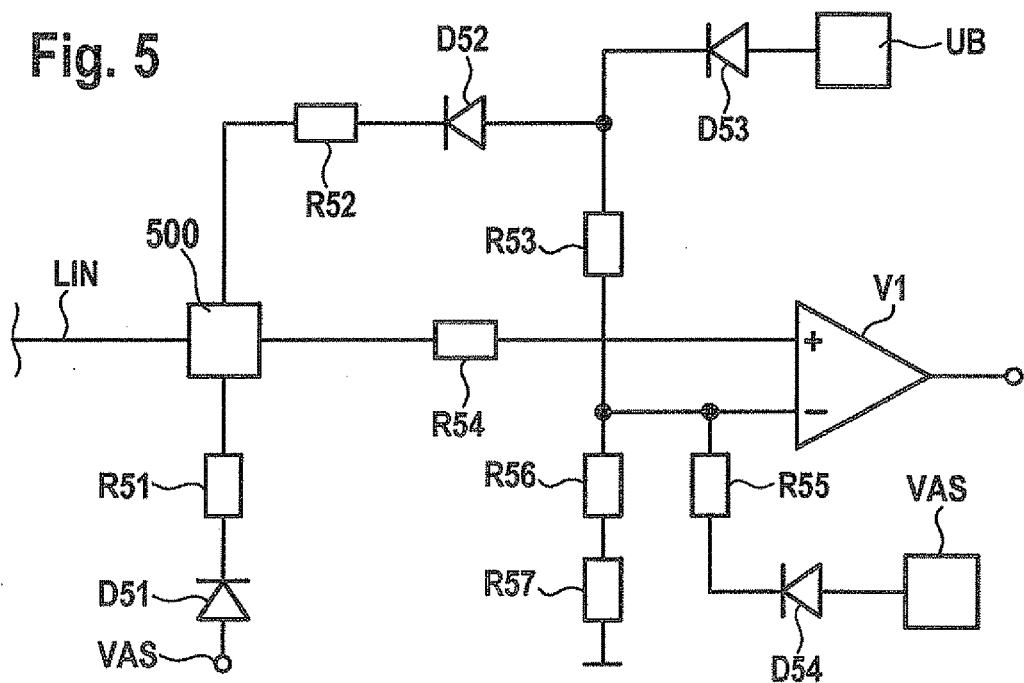
FIG. 5 shows an additional exemplary embodiment of the circuit according to the present invention.

FIG. 5 shows an additional exemplary embodiment of the circuit according to the present invention. At this point again, only one comparator V1 is used, to which both battery voltage UB and digital supply voltage VAS are connected, respectively via diodes D53 and R53, and via resistor R55 and diode 455, in the manner described in FIG. 3. The LIN bus is connected to the positive input of comparator V1 via interface 500 and resistor R54. The above-described voltage divider is formed by resistors R56 and R57, which are connected to the negative input of reference input element V1. The battery voltage is conducted via diode D53, D52 and resistor R52 to connection point 500, which is connected to the LIN bus. As mentioned above, the LIN bus is a single-wire bus.

Furthermore, supply voltage VAS is connected to connection point 500 via diode D51 and R51 in the forward direction. In this instance as well, the higher voltage through the diodes polarized in the forward direction will ultimately prevail. Circuit R51, D51 and VAS implement a so-called pull-up circuit, so that the LIN bus is supplied with the BUS open-circuit voltage even in the case of the autarchy of the airbag control device (e.g., master pull-up). In the case of a configuration of airbag control device and weight-sensing system (weight-sensing system also supplied by airbag control device in the autarchy case) it is necessary to supply the interface with a suitable BUS voltage for the transmission of data both from the master (airbag) and from the slave node (weight sensor system).

Figure 6:
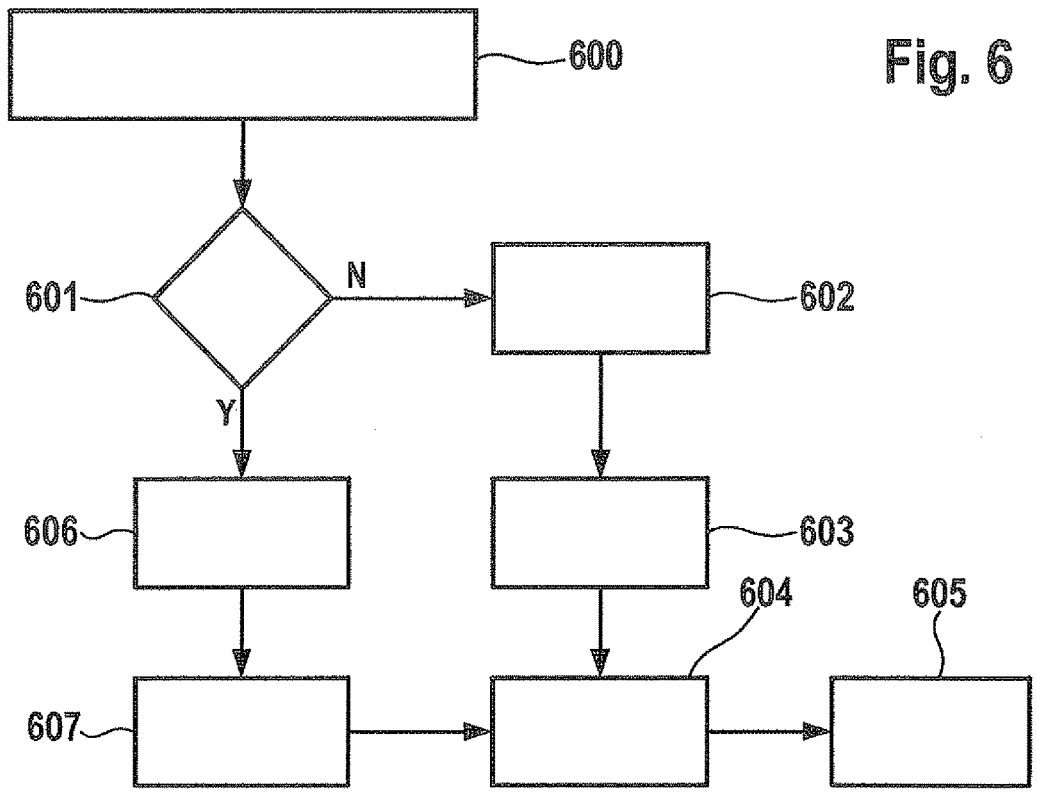
FIG. 6 shows a flow chart of the method according to the present invention.

The flow chart in FIG. 6 shows the method according to the present invention. The LIN signal is received in method step 600. In method step 601, a check is performed to see whether the autarchy case exists or not. If it does not exist, then in method step 602 the switching threshold is formed using the battery voltage so that then this switching threshold is used to detect the LIN signal in method step 603. In method step 604, the processing of the detected signals is carried out in microcontroller µC, for example. In method step 605, the triggering then takes place as a function of this processing.

If it was determined in method step 601 that an autarchy case exists, then in method step 606, the switching threshold is formed from an analog supply voltage of the control device that is independent of autarchy. In the exemplary embodiments, this supply voltage is voltage VAS. To be useful, it should have approximately 6.3 . . . 8 V in order to achieve voltage levels at the BUS that are directly comparable to the lowest value of the LIN specification UB=8V, regardless of whether Si diodes (minimum requirement according to the norm), Shottky diodes, or even back to back switched MOS-FET transistors are used as diodes D4 in FIG. 3, D42 in FIG. 4, D54, D51 in FIG. 5. In method step 607, the detection is then performed using this formed switching threshold in order to then proceed into method step 604 for the processing of the detected signals.

What is claimed is:

1. A control device for triggering a passenger protection arrangement in a vehicle, the control device comprising:
   an interface receiving at least one signal derived from both a transmitted signal and a vehicle battery voltage of a vehicle battery that powers the vehicle;
   a trigger circuit that includes a switching threshold input and that is configured to trigger the passenger protection arrangement as a function of a result of a comparison between the at least one signal and a switching threshold provided to the switching threshold input; and
   a threshold deriving circuit that is structured to form the switching threshold;
   wherein:
      the threshold deriving circuit includes (a) a main line that is electrically connected to the switching threshold input of the trigger circuit, (b) a first branching line, and (c) a second branching line;
      the first branching line and the second branching line simultaneously branch from the main line;
      simultaneously, a supply voltage is provided onto an input side of the first branching line and the vehicle battery voltage is provided onto an input side of the second branching line;
      the supply voltage is sourced by an energy reserve that is able to provide the supply voltage for a limited time after a fault occurs in the vehicle battery or a connection of the control device to the vehicle battery; and
      the simultaneous branching of the first branching line and the second branching line from the main line:
         causes a value of a voltage on the main line, which is provided as the switching threshold to the switching threshold input of the trigger circuit, to be set based on whichever of the voltages of the respective input sides of the first and second branching lines is greater and not based on the other of the voltages, even during the simultaneous provision of the supply voltage and the vehicle battery voltage onto, respectively, the input side of the first branching line and the input side of the second branching line;
         causes that, whenever in a non-autarchy mode in which the vehicle battery is faultless and the connection between the control device and the vehicle battery is faultless, the vehicle battery effects the switching threshold without impact on the switching threshold by the supply voltage of the energy reserve; and
         causes that, in response to transition from the non-autarchy mode to an autarchy mode in which the fault occurs in the vehicle battery or in the connection between the control device and the vehicle battery, for the limited time after the occurrence of the fault, the energy reserve effects the switching threshold without impact on the switching threshold by the vehicle battery voltage of the vehicle battery.

2. The control device of claim 1, wherein a supply module produces the supply voltage as a digital level.

3. The control device of claim 2, wherein an integrated circuit includes the interface, the threshold deriving circuit, and the supply module.

4. The control device of claim 1, wherein the switching threshold is produced by a hysteresis circuit.

5. The control device of claim 1, wherein the interface has a pull-up circuit for transmitting data.

6. The control device of claim 5, wherein the pull-up circuit conducts the supply voltage to a transmission line via at least one second resistor and at least one second diode.

7. The control device of claim 1, wherein the supply voltage is formed from the vehicle battery voltage when the vehicle battery voltage is available, and formed from an energy reserve when the vehicle battery voltage is not available.

8. The control device of claim 1, wherein the threshold deriving circuit is structured such that whichever of the voltages present on the first and second branching lines is greater blocks the other of the voltages present on the first and second branching lines from being used for setting the switching threshold.

9. The control device of claim 1, wherein:
the supply voltage is input to a first diode located in the first branching line;
the vehicle battery voltage is input to a second diode located in the second branching line;
the first diode and the second diode are each forward-biased in a direction of a comparator of the trigger circuit that includes the switching threshold input and that includes another input at which the at least one signal is applied for comparison to the value of the voltage at the switching threshold input; and
the first branching line is connected to the second branching line at a location of the switching threshold input of the comparator.

10. The control device of claim 9, further comprising:
a voltage divider connecting the location of the switching threshold input of the comparator to ground.

11. The control device of claim 9, wherein:
the switching threshold input to the comparator is a negative input of the comparator; and
the other input of the comparator is a positive input of the comparator.

12. The control device of claim 1, further comprising:
an energy reserve;
a supply module that is configured to (a) produce the supply voltage from the vehicle battery voltage whenever the vehicle battery voltage is available and (b) produce the supply voltage from the energy reserve conditional upon the vehicle battery voltage being unavailable;
wherein the threshold deriving circuit is structured such that, when the vehicle battery voltage is unavailable, the switching threshold is formed exclusively by the supply voltage.

13. The control device of claim 1, wherein, due to the structure of the first and second branching lines, whenever one of the voltages on the first and second branching lines is greater than the other of the voltages on the first and second branching lines, the presence of the greater of the voltages blocks the voltage at the switching threshold input from being set based on the lesser of the voltages.

14. The control device of claim 1, wherein the energy reserve is a part of the control device.

15. The control device of claim 1, wherein the energy reserve is one or more capacitors.

16. A control device for triggering a passenger protection arrangement in a vehicle, the control device comprising:
an interface receiving at least one signal derived from both a transmitted signal and a vehicle battery voltage of a vehicle battery that powers the vehicle;
a trigger circuit;
a first comparator; and
a second comparator;
wherein:
the at least one signal is applied to a respective first input terminal of each of the first and second comparators;
the vehicle battery voltage is applied to a second input terminal of the first comparator;
the supply voltage is applied to a second input terminal of the second comparator and is sourced by an energy reserve that is able to provide the supply voltage for a limited time after a fault occurs in the vehicle battery or a connection of the control device to the vehicle battery;
each of the first and second comparators is configured to compare voltage levels applied to its respective first and second input terminals and output (a) a first output signal whenever the voltage level at one of its respective first and second input terminals is greater than the voltage level at the other of its respective first and second input terminals and (b) otherwise a second output signal;
the control device is structured so that:
(i) whenever the vehicle battery voltage is greater than the supply voltage, which is always the case in a non-autarchy mode in which the vehicle battery is faultless and the connection between the control device and the vehicle battery is faultless:
output of the first comparator varies between the first and second output signals based on a value of the at least one signal; and
the levels of the supply voltage applied to the second input terminal of the second comparator and of the at least one signal are constantly such that the second output signal is constantly output by the second comparator regardless of the value of the at least one signal; and
(ii) whenever the supply voltage is greater than the vehicle battery voltage, which occurs for the limited time in response to a transition from the non-autarchy mode to an autarchy mode in which the fault occurs in the vehicle battery or in the connection between the control device and the vehicle battery:
output of the second comparator varies between the first and second output signals based on a value of the at least one signal; and
the levels of the vehicle battery voltage applied to the second input terminal of the first comparator and of the at least one signal are constantly such that the second output signal is constantly output by the first comparator regardless of the value of the at least one signal; and
the trigger circuit is configured to trigger the passenger protection arrangement in response to, and conditional upon, at least one of the first and second comparators outputting the first output signal.

17. The control device of claim 16, wherein the control device is structured so that (i) whenever the vehicle battery voltage is greater than the supply voltage, (a) the voltage applied to the second input terminal of the first comparator is either greater or less than the voltage applied to the first input terminal of the first comparator depending on the at least one signal and (b) the voltage applied to the second input terminal of the second comparator is less that the voltage applied to the first input terminal of the second comparator, and (ii) whenever the supply voltage is greater than the battery voltage, (a) the voltage applied to the second input terminal of the second comparator is either greater or less than the voltage applied to the first input terminal of the second comparator depending on the at least one signal and (b) the voltage applied to the second input terminal of the first comparator is less that the voltage applied to the first input terminal of the first comparator.

18. A method for triggering a passenger protection arrangement in a vehicle, the method comprising:
receiving, via an interface and at a first input terminal of a comparator, at least one signal that is derived from both a transmitted signal and a vehicle battery voltage of a vehicle battery that powers the vehicle;
receiving a switching threshold at a second input terminal of the comparator, wherein:
a first branching line of a circuit and a second branching line of the circuit simultaneously branch from a main line of the circuit;
the main line of the circuit is electrically connected to the second terminal;
simultaneously, a supply voltage is provided onto an input side of the first branching line and the vehicle battery voltage is provided onto an input side of the second branching line;
the supply voltage is sourced by an energy reserve that is able to provide the supply voltage for a limited time after a fault occurs in the vehicle battery or a connection of a control device to the vehicle battery; and
the simultaneous branching of the first branching line and the second branching line from the main line:
causes a value of a voltage on the main line, which is provided as the switching threshold to the second input terminal of the comparator, to be set based on whichever of the voltages of the respective input sides of the first and second branching lines is greater and not based on the other of the voltages, even during the simultaneous provision of the supply voltage and the battery voltage onto, respectively, the input side of the first branching line and the input side of the second branching line;
causes that, whenever in a non-autarchy mode in which the vehicle battery is faultless and the connection between the control device and the vehicle battery is faultless, the vehicle battery effects the switching threshold without impact on the switching threshold by the supply voltage of the energy reserve; and
causes that, in response to transition from the non-autarchy mode to an autarchy mode in which the fault occurs in the vehicle battery or in the connection between the control device and the vehicle battery, for the limited time after the occurrence of the fault, the energy reserve effects the switching threshold without impact on the switching threshold by the vehicle battery voltage of the vehicle battery;
comparing the voltage provided as the switching threshold at the second terminal to the at least one signal at the first input terminal; and
triggering the passenger protection arrangement based on a result of the comparison.

19. The method of claim 18, wherein the voltage at the second terminal is a switching threshold that is used as a hysteresis.

20. The method of claim 18, further comprising:
forming the supply voltage from the vehicle battery voltage when the vehicle battery voltage is available; and
forming the supply voltage from an energy reserve when the vehicle battery voltage is not available.

21. The method of claim 18, further comprising:
arranging the first and the second branching lines so that when one of the branching lines has a higher voltage than the other branching line, the higher voltage branching line operates to block the lower voltage branching line.

22. The method of claim 21, further comprising:
inputting the supply voltage to a first diode located in the first branching line;
inputting the vehicle battery voltage to a second diode located in the second branching line;
arranging each of the first diode and the second diode in a forward-biased configuration in a direction of the comparator; and
connecting the first branching line to the second branching line at a location of the second input terminal of the comparator.

23. The method of claim 22, further comprising:
connecting a voltage divider between the location of the second input terminal of the first comparator and ground.

24. The method of claim 22, wherein the second input terminal of the comparator is a negative input, and the first input terminal of the comparator is a positive input.

25. The method of claim 21, further comprising:
connecting the first branching line and the second branching line together at a common node, which common node feeds the second input terminal of the first comparator, such that a voltage developed at the common node is always the greater of the supply voltage and the vehicle battery voltage.

26. A control device for triggering a passenger protection arrangement in a vehicle, the control device comprising:
an interface receiving at least one signal derived from both a transmitted signal and a vehicle battery voltage;
a trigger circuit
a first comparator; and
a second comparator;
wherein:
the at least one signal is applied to a respective first input terminal of each of the first and second comparators;
the vehicle battery voltage is applied to a second input terminal of the first comparator;
the supply voltage is applied to a second input terminal of the second comparator and is sourced by an energy reserve that is able to provide the supply voltage for a limited time after a fault occurs in the vehicle battery or a connection of the control device to the vehicle battery;

each of the first and second comparators is configured to compare voltage levels applied to its respective first and second input terminals and output a first output signal whenever the voltage level at its respective first input terminal is greater than the voltage level at its respective second input terminal and a second output signal whenever the voltage level at its respective second input terminal is greater than the voltage level at its respective first input terminal;

the control device is structured so that:

(i) whenever the vehicle battery voltage is greater than the supply voltage, which is always the case in a non-autarchy mode in which the vehicle battery is faultless and the connection between the control device and the vehicle battery is faultless:

output of the first comparator varies between the first and second output signals based on a value of the at least one signal; and the supply voltage applied to the second input terminal of the second comparator will constantly remain less than the value of the at least one signal, so that the first output signal is constantly output by the second comparator regardless of the value of the at least one signal; and (ii) whenever the supply voltage is greater than the vehicle battery voltage, which occurs for the limited time in response to a transition from the non-autarchy mode to an autarchy mode in which the fault occurs in the vehicle battery or in the connection between the control device and the vehicle battery:

output of the second comparator varies between the first and second output signals based on a value of the at least one signal; and the vehicle battery voltage applied to the second input terminal of the first comparator will constantly remain less than the value of the at least one signal, so that the first output signal is constantly output by the first comparator regardless of the value of the at least one signal; and the trigger circuit is configured to trigger the passenger protection arrangement in response to, and conditional upon, both of the first and second comparators outputting the first output signal.

\* \* \* \* \*